United States Patent [19]
McIntyre et al.

[11] Patent Number: 5,072,896
[45] Date of Patent: Dec. 17, 1991

[54] POWERED CANOPY BREAKERS

[75] Inventors: Robert G. McIntyre, Manhattan Beach; Alexander B. McDonald, Long Beach, both of Calif.

[73] Assignee: McDonnell Douglas Corporation, Long Beach, Calif.

[21] Appl. No.: 522,808

[22] Filed: May 14, 1990

[51] Int. Cl.⁵ .............................................. B64D 25/10
[52] U.S. Cl. .............................. 244/122 AF; 102/272
[58] Field of Search ......... 244/121, 122 AE, 122 AF; 102/272, 274, 275; 89/1.14

[56] References Cited
U.S. PATENT DOCUMENTS 3,152,781 10/1964 Martin .......................... 244/122 AF
3,542,319 11/1970 Duncan et al. ............... 244/122 AF Primary Examiner—Joseph F. Peters, Jr.
Assistant Examiner—Linda L. Palomar
Attorney, Agent, or Firm—Donald E. Stout; Gregory A. Cone; John P. Scholl

[57] ABSTRACT

A powered canopy breaker attached to an ejection seat, that fractures a canopy when the seat is ejected. The breaker has a piston that is operatively connected to an explosive cartridge. When the seat is ejected, the piston engages the canopy, pushing the piston a predetermined distance until the cartridge is detonated. The detonated cartridge thrusts the piston back, fracturing the canopy.

17 Claims, 1 Drawing Sheet

POWERED CANOPY BREAKERS

BACKGROUND OF THE INVENTION

When an ejection seat jettisons out of an airplane, it must clear the transparent canopy at the top of the cockpit. Typically, the canopy is removed before the seat is ejected. In the event the canopy is not discharged, or the plane does not have a canopy ejection system, it is desirable to have a seat capable of blasting through the canopy.

It has been found that ejection seats have difficulty penetrating the canopy with the shear force of the seat. Therefore, it is preferable to have the canopy fractured before the seat reaches the canopy. Prior attempts to fracture the canopy, include attaching a detonating cord about the canopy, to break it up when the cord is detonated. Although effective, the attachment of the cord is labor intensive and involves the additional step of detonating the cord before the seat is ejected.

Another option is to mount a spear like member to the top of the seat, that punctures and fractures the canopy when the seat is catapulted upward. The stationary spear relies on the energy of the seat to penetrate the canopy. With the use of thicker bird resistant canopies, it requires more seat thrust to fracture the canopy, with some small seats unable to penetrate the canopy at all. Therefore what is needed is a self-actuated powered canopy breaker that causes the canopy to fracture, before the seat comes in contact with the canopy.

SUMMARY OF INVENTION

This invention is a powered canopy breaker attached to an ejection seat, that fractures a canopy when the seat is ejected. The breaker has a piston that is operatively connected to an explosive cartridge. When the seat is ejected, the piston engages the canopy, pushing the piston a predetermined distance until the cartridge is detonated. The detonated cartridge thrusts the piston back, fracturing the canopy. The canopy is thus broken before contact with the seat, using the additional energy supplied by the cartridge. The breaker is self-actuated through the engagement of the piston with the canopy. There is no external controllers or switches.

The canopy breaker can be constructed such that it can be reused by merely replacing the cartridge. The breaker can also have a pin to prevent accidental firing of the cartridge. The pin attaches the piston to the housing, restraining piston travel until the pin is sheared by a predetermined force exerted on the piston.

Therefore it is an object of this invention to provide a reusable self-contained powered canopy breaker, with no functional connection to the seat or aircraft.

It is also an object of this invention to provide a powered canopy breaker, of such construction to prevent accidental misfire of the breaker.

It is also an object of this invention to provide a powered canopy breaker that is simple to use, inexpensive and can be easily retrofitted onto existing ejection seats.

It is also an object of this invention to provide a powered canopy breaker capable of fracturing canopies of varying thickness.

It is also an object of this invention to provide a powered canopy breaker that fractures a canopy without the use of detonating cord.

DETAILED DESCRIPTION OF THE DRAWINGS

The objectives and advantages of this invention will become more apparent to those skilled in the art after reviewing the following specification and drawings, wherein.

DETAILED DESCRIPTION OF THE INVENTION

Figure 1:
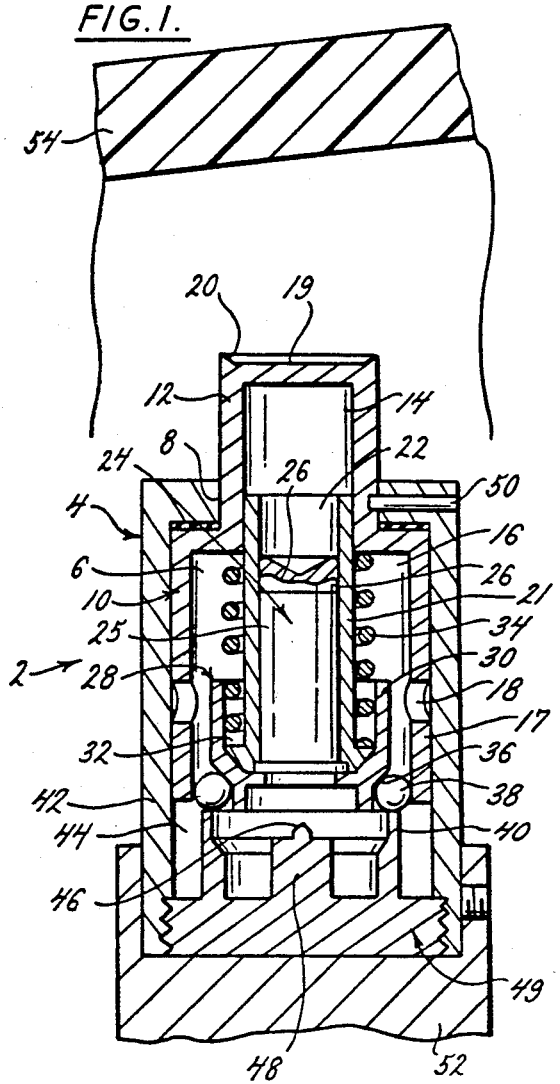
FIG. 1 is a cross-sectional side view of a powered canopy breaker in a static condition.

Referring to the drawings more particularly by reference numbers, number 2 in FIG. 1 is a powered canopy breaker 2. The breaker 2 has a housing 4 with a first cavity 6 and a first opening 8. Within the first cavity 6 is a piston 10 with a cutter portion 12 that extends from the first opening 8. The Piston 10 has a first bore 14 within the cutter portion 12 and a second bore 16 within a base portion 17 of the piston 10. The piston 10 has three apertures 18, preferably spaced equally about the base portion 17. The cutter portion 12 may have a countersink 19 on the top surface, that is sharpened to produce a radial blade 20. Within the piston 10 is a breech 21 having a third bore 22. The breech 21 holds a cartridge 24. The cartridge 24 can be a standard 25 or 38 caliber shell 25 with a detachable slug 26, or a pyrotechnic cartridge that when detonated releases a high pressure gas. Attached to the breech 21 is a cup 28 having outer walls 30 that extend essentially parallel to the breech 21. The space between the outer walls 30 and breech 21 forms a first radial slot 32 around the breech 21. Within the slot 32 is a spring 34 that extends to the piston 10. The cup 28 has an oblique radial outer seat 36. The oblique radial seat 36 is in contact with three retaining balls 38, which are supported by a radial flange 40 that extends from the housing 4. The radial flange 40 is spaced from the outer walls 42 of the housing 4, such that the space between the flange 40 and walls 42 forms a second radial slot 44 which allows the piston 10 to travel in the first cavity 6. The balls 38 are also in contact with the inner surface of the piston 10. The balls 38 support the breech 21, spacing the cartridge 24 from a firing pin 46 mounted on a post 48 extending from the housing 4. The distance between the balls 38 and aperature 18 should be no more than the distance from the end of the cutter portion 12 to the top of the housing 4. The radial flange 40, post 48 and firing pin 46, can be part of an end cap 49 that screws into the end of the housing 6 for easy access to the cartridge 24. A shear pin 50 can be added to attach the piston 10 to the housing 4, to prevent the piston 2 from moving and accidentally firing the breaker 2. The breaker 2 may be mounted by means on top of an ejection seat 52 and can also be attached to the arms of the ejection seat 52.

Figure 2:
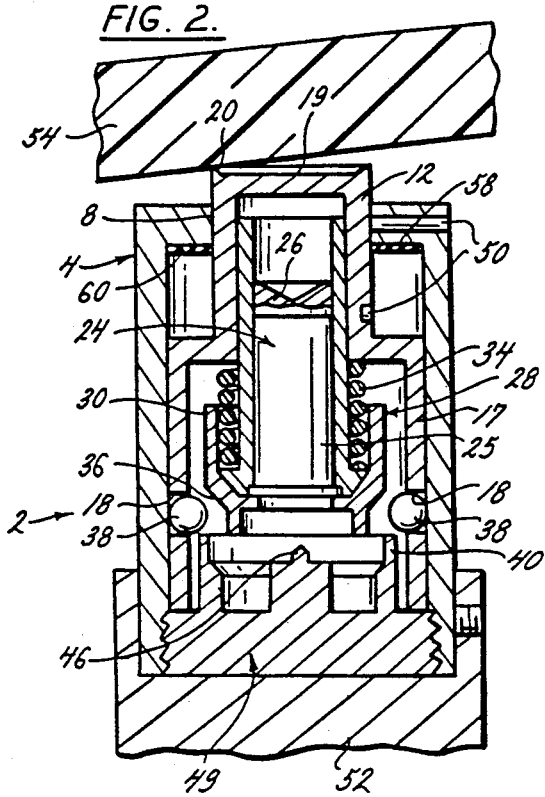
FIG. 2 is a cross-sectional side view of a powered canopy breaker, wherein a piston has engaged a canopy, a cartridge has been released and is about to be pushed into a firing pin by a compressed spring.
Figure 3:
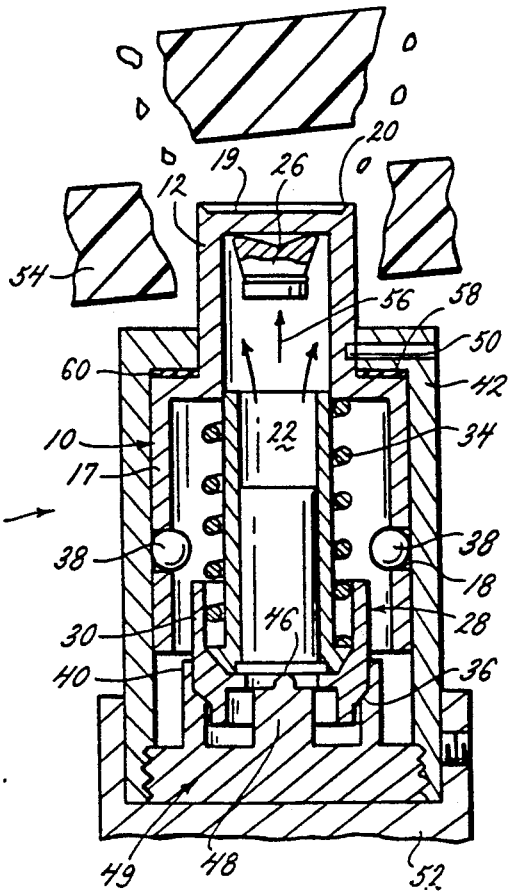
FIG. 3 is a cross-sectional side view of a powered canopy breaker, wherein the cartridge has fired a slug into the piston, causing the piston to penetrate and fracture the canopy.

In operation, the ejection seat 52 is deployed, sending the seat 52 and breaker 2 toward a canopy 54. The canopy 54 being transparent and typically made of a material such as acrylic. The cutter portion 12 engages the canopy 54, the upward thrust of the seat and the reactant force of the canopy 54 shears the pin 50, allowing the piston 10 to move relative to the housing 4, see FIG. 2. The continuing movement of the seat 52 presses the cutter portion 12 into the housing 4, until the apertures 18 align with the balls 38. The spring 34 is compressed and the balls 38 are pushed into the apertures 18 by the oblique outer seat 36 through the force of the spring 34. The cup 28 is released from the housing 4, allowing the breech 21 and cartridge 24 to move in a direction toward the firing pin 46. The kinetic energy of the compressed spring 34 forces the cartridge 24 into the firing pin 46, detonating the cartridge 24, which fires the slug 26 into the cutter portion 12, see FIG. 3. The force of the slug 26 causes the piston 10 to move in a direction toward the canopy 54. The energy of the slug 26 and the expanding high pressure gas 56 of the cartridge 24 drives the cutter portion 12 through canopy 54. The cutter portion 12 penetration of the canopy 54, allows the seat 52 to easily blast through the canopy 54.

The housing 4 should preferable have a snubber 58 that limits the travel of the piston 10, such that the piston 10 can be used again. The snubber 58 can be formed from the outer wall 42 of the housing 4 next to the first opening 8. Additionally, a dampener 60 can be attached to the snubber 58, to dampen the impact of the piston 10 on the snubber 58. The dampener 60 can be, but is not limited to, a wavy washer, an elastomeric pad or a malleable metal washer.

Figure 4:
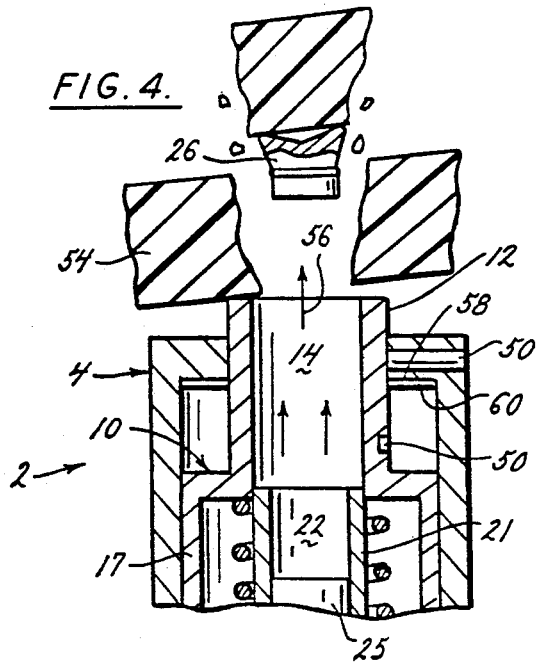
FIG. 4 is a cross-sectional side view of a powered canopy breaker, wherein the cutter portion of the piston has a bore through it, allowing the slug to exit the breaker and fracture the canopy.

FIG. 4 shows an alternate embodiment, wherein the first bore 14 of the piston 10 can extend through the cutter portion 12, such that the slug 26 is allowed to break through the canopy 54 as a projectile. To prevent contamination, the piston 10 may have a protective plastic cap (not shown) covering the first bore 14.

While certain exemplary embodiments of this invention have been described above and shown in the accompanying drawings, it is to be understood that such embodiments are merely illustrative of, and not restrictive on, the broad invention. The invention is not to be limited by the specific constructions or arrangements shown and described, since various other modifications may occur to persons having ordinary skill in the art.

What is claimed is:

1. A device attached to an ejection seat, that penetrates a canopy when the ejection seat is ejected, comprising:
    a) a housing having a first cavity and a first opening;
    b) a piston within said first cavity having a cutter portion extending through said first opening;
    c) cartridge means operatively connected to said piston for powering said piston in a direction toward the canopy when said cartridge means is detonated, said cartridge means comprising an explosive shell and a detachable slug, said slug releasing from said explosive shell when said explosive shell is detonated; and
    d) detonating means for detonating said cartridge means when a predetermined force is exerted on said piston; whereby when the ejection seat is ejected and said cutter portion presses against the canopy, said detonating means detonates said cartridge means, driving said cutter portion into the canopy.

2. A device attached to an ejection seat, that penetrates a canopy when the ejection seat is ejected, comprising:
    a) a housing having a first cavity and a first opening;
    b) a piston within said first cavity having a cutter portion extending through said first opening and a first bore within said cutter portion, said piston adapted to travel within said housing;
    c) cartridge means for powering said piston in a direction toward the canopy, when said cartridge means is detonated;
    d) a breech that retains said cartridge means;
    e) support means for supporting said breech within said first cavity;
    f) release means for releasing said support means from said breech, when said piston travels a predetermined distance;
    g) firing means for detonating said cartridge means when said firing means operatively connects with said cartridge means; and
    h) spring means operatively connected to said breech for biasing said cartridge means into operative connection with said firing means when said release means releases said support means from said breech; whereby when the ejection seat is ejected and said cutter portion presses against the canopy, said piston travels in a direction away from the canopy until said support means is released from said breech, wherein said spring means creates operative contact between said cartridge means and said firing means, detonating said cartridge means and driving said cutter portion into the canopy.

3. The device as recited in claim 2, further comprising restraining means for restraining said piston travel, until a predetermined force is exerted on said piston by the canopy.

4. The device as recited in claim 3, wherein said restraining means is a pin that attaches said piston to said housing, said pin shearing at a predetermined force when said cutter portion presses against the canopy.

5. The device as recited in claim 3, wherein said first bore extends through said cutter portion and said cartridge means comprises an explosive shell and a detachable slug, said slug releases from said explosive shell when said explosive shell is detonated, firing said slug through said first bore, whereby said slug penetrates the canopy.

6. The device as recited in claim 2, wherein said cartridge means comprises an explosive shell and a detachable slug, said slug releases from said explosive shell when said explosive shell is detonated.

7. The device as recited in claim 2, wherein said housing has a snubber that restricts the travel of said piston, when said cartridge means is detonated and said piston is driven in a direction toward the canopy.

8. The device as recited in claim 7, further comprising dampener means attached to said snubber, for dampening the impact of said piston on said snubber.

9. A device attached to an ejection seat, that penetrates a canopy when the ejection seat is ejected, comprising:
    a) a housing having a first cavity, a first opening and a snubber;
    b) a piston having a base portion within said first cavity and a cutter portion extending from said housing through said first opening, said piston having a first bore within said cutter portion, a second bore and at least two apertures in said base portion, said base portion being restrained from movement out of said first cavity by said snubber, said piston adapted to travel within said housing;

c) a breech within said first cavity having a third bore in fluid communication with said first bore;

d) cartridge means within said third bore for powering said piston in a direction toward the canopy, when said cartridge means is detonated;

e) a cup attached to said breech having an oblique outer radial seat;

f) at least two retaining balls contiguous to said oblique outer radial seat and said housing, said retaining balls support said breech within said first cavity and release from said breech when said piston travels a predetermined distance and said apertures align with said retaining balls;

g) a firing pin attached to said housing within said first cavity; and h) a spring extending from said cup to said piston, said spring biases said cartridge means into said firing pin when said retaining balls release from said breach; whereby when the ejection seat is ejected and said cutter portion presses against the canopy, said piston moves relative to said breech in a direction toward said firing pin, simultaneously compressing said spring, said piston movement continuing until said retaining balls are aligned and pushed into said apertures by said spring and said oblique outer radial seat, wherein said breech is released from said retaining balls and said cartridge means is pushed into said firing pin by said spring, detonating said cartridge means and driving said cutter portion into the canopy.

10. The device as recited in claim 9, further comprising restraining means for restraining said piston travel, until a predetermined force is exerted on said piston by the canopy.

11. The device as recited in claim 10, wherein said restraining means is a pin that attaches said piston to said housing, said pin shearing at a predetermined force when said cutter portion presses against the canopy.

12. The device as recited in claim 10, wherein said first bore extends through said cutter portion and said cartridge means comprises an explosive shell and a detachable slug, said slug releases from said explosive shell when said explosive shell is detonated, firing said slug through said first bore, whereby said slug penetrates the canopy.

13. The device as recited in claim 9, wherein said cartridge means comprises an explosive shell and a detachable slug, said slug releases from said explosive shell when said explosive shell is detonated.

14. The device as recited in claim 9 further comprising dampener means attached to said snubber, for dampening the impact of said piston on said snubber.

15. The device as recited in claim 9, wherein said cutter portion has a blade facing the canopy, to initiate penetration of the canopy.

16. The device as recited in claim 9, wherein at least two of said devices are mounted on the top of the ejection seat.

17. The device as recited in claim 16, wherein at least two of said devices are attached to the arm portion of the ejection seat.

* * * * *